United States Patent [19]

Shreve

[11] Patent Number: 5,265,846
[45] Date of Patent: Nov. 30, 1993

[54] VALVE HAVING MECHANICAL CLOSURE ASSIST

[75] Inventor: Craig D. Shreve, Fogelsville, Pa.
[73] Assignee: Valv-Tech, Inc., Fogelsville, Pa.
[21] Appl. No.: 965,334
[22] Filed: Oct. 23, 1992
[51] Int. Cl.⁵ .............................. F16K 1/22
[52] U.S. Cl. ................................. 251/188
[58] Field of Search .......................... 251/188

[56] References Cited

U.S. PATENT DOCUMENTS

| | | | |
|---|---|---|---|
| 1,740,041 | 12/1929 | Schmidt | 251/188 X |
| 3,512,752 | 5/1968 | Uerlichs et al. | 251/308 |
| 4,586,693 | 5/1986 | Tinner | 251/56 |
| 4,634,094 | 1/1987 | Geiser | 251/58 |
| 4,770,392 | 9/1988 | Schmidt | 251/158 |

Primary Examiner—John C. Fox
Attorney, Agent, or Firm—Eckert Seamans Cherin & Mellott

[57] ABSTRACT

A mechanical closure assist is provided for a valve having a valve casing with a wall and an internal surface defining a valve seat. A disc is pivotable within the casing from an open position to a closed position. The disc defines front and back faces. The front face defines a sealing surface for sealingly contacting the valve seat when the disc is in the closed position. A reciprocating rod is movable at least partly laterally relative to the flow path, from a retracted position clear of the flow path to an extended position where the rod bears on the back face of the disc to urge the sealing surface of the disc into engagement with the valve seat. The rod advancing structure can be mounted directly on the valve casing or an adjacent section of conduit. The rod can be inclined or the rod can be provided with a wedging shape such that lateral advance of the rod urges the disc sealing surface closed in a direction parallel to axial flow through the valve. The rod may cooperate with a pad on the disc to obtain a wedging action. The invention counteracts the tendency of differential pressure to lift one side of a pivoting disc valve from its seat, without occluding flow through the valve when open.

12 Claims, 3 Drawing Sheets

VALVE HAVING MECHANICAL CLOSURE ASSIST

BACKGROUND OF THE INVENTION

1. Field of the Invention

The invention relates to a mechanical closure assist for a valve having a displaceable disc for engaging a valve seat to seal against fluid pressure. The closure assist can be mounted in or adjacent a valve casing carrying the disc and bears controllably against the disc for urging the disc against the seat.

2. Prior Art

Shutoff valves are known with a displaceable disc or similar valve body which may be operably engaged against a valve seat to seal against fluid pressure, or raised from the valve seat to allow flow between the disc and the structure defining the seat. These valves generally include a mechanical actuator for moving the disc into engagement with the seat.

In a simple construction for a shutoff valve, the disc is mounted on a rotatable shaft passing transversely across the valve, for example across a diameter of the disc. The disc can be rotated relative to the axis of the shaft or the like, either to position the edges of the disc against the valve seat and thereby occlude flow, or to pivot from the valve seat to allow flow along the disc, i.e., between the disc and the valve seat. The disc undergoes a simple pivoting movement through approximately 90° from a fully opened position to a fully closed position, typically by rotating a shaft to which the disc is fixed. In the fully opened position the disc can be positioned such that its edge or minimum thickness intersects flow through the conduit or the like in which the valve is located. In the fully closed position the face of the disc occludes flow.

In a more complex arrangement for moving the disc in a shutoff valve, a linkage is included for moving the disc in both a pivoting movement for controlling whether or not the disc generally occludes the conduit, and through a linear displacement toward or away from the valve seat for sealing. Examples of such linkages are disclosed in U.S. Pat. No. 3,512,752—Uerlichs et al.; U.S. Pat. No. 4,586,693—Tinner; U.S. Pat. No. 4,634,094—Geiser; and, U.S. Pat. No. 4,770,392—Schmidt. Rotation on the shaft brings the valve disc into the vicinity of the valve seat, and the linkages provide linear movement of the valve disc for bearing more directly against the seat. The linear movement of the valve disc reduces friction between the disc and its seat, thereby reducing abrasion of these parts and providing longer disc and seat life. These linkages also urge the disc more tightly against the seat than is possible with a simple pivoting movement.

Pivoting valve disc mountings with displacement linkages suffer from the drawback that they are more complex than simple pivoting linkages, leading to additional expense and the potential for mechanical failure. Furthermore, these linkages place additional parts in the flow path through the conduit. Whereas with a simple rotating arrangement the cross section of the disc is minimal when the valve is open, the additional parts of a linkage with displacement features interfere with fluid flow through the open valve.

An additional problem arises when the shutoff valve is relatively large. As the diameter of the valve disc is increased, the torque applied to the central shaft must be increased to obtain the same amount of pressure between the sealing surfaces remote from the axis of rotation, as compared to a smaller diameter disc and the same amount of central shaft torque. Rotatable disc shutoff valves having a disc diameter of 48 inches or more are used in steam, air and other fluid flow systems. In a particularly demanding application, rotatable disc shutoff valves are used in systems for incineration of volatile organic compounds. The incineration process is carried out at such high temperatures that elastomeric seals are unsuitable for use in the valves. All sealing occurs at metal to metal abutting sealing surfaces within the valve casing.

It is known to incorporate a "step seat" in a valve casing for a pivotable or pivotable-and-displaceable valve disc. The step seat is an arcuate member or flange which extends radially inwardly from a wall of the structure defining the flow path through the valve casing. The step seat is structured to provide a sealing surface for a marginal outer portion of the valve disc. Normally, for a rotatable disc, a pair of step seats are provided to engage the valve disc on opposite axial sides relative to the direction of flow. The disc bears on the seat around the periphery of the valve casing, including at diametrically opposite sides of the valve casing remote from the disc rotation axis.

When the disc is rotated into the closed position, the disc contacts both of the step seats, but on opposite axial sides relative to the direction of flow. Therefore, one of the step seats is on a high pressure side of the disc, and the other of the step seats is on a low pressure side of the disc. Fluid pressure on the high pressure side of the disc helps to urge the disc against its step seat, toward the low pressure side of the disc and assisting in sealing. However, the fluid pressure on the high pressure side of the disk tends to detract from sealing on the opposite side of the disc. On the side where the step seat is on the high pressure side of the disc, the fluid pressure acts to lift the disc off the step seat. Only the stiffness of the disc resists fluid pressure from forcing one side of the disc to move away from its respective seat.

For a large diameter disc, even relatively modest pressure differentials can be sufficient to deform the disc so that it is lifted by a small amount from the step seat on the higher pressure side of the disc. In some applications, a gap of several thousandths of an inch can substantially detract from operation of the flow system including the valve. A disc of this type can be reinforced by adding material to stiffen the disc and resist deformation, but this solution results in a very heavy or perhaps unbalanced disc which is more difficult to rotate, requiring a more powerful actuator mechanism. The rotatable shaft and its bearings are subject to greater wear due to the increased loads caused by the heavier valve disc. Similarly, the disc might be formed such that the side tending to be lifted by pressure is preloaded by forming the disc so as to be nonplanar, i.e., such that the side tending to be lifted engages its step seat before the opposite side. The disc must then be shaped for a specific pressure, which is at best inconvenient, and is unworkable where the pressure is to vary.

There is a need for a device which will maintain a seal between the valve disc and valve seat without the drawbacks associated with a thickened, heavy valve disc or a complicated rotation/displacement mounting and other solutions for this problem in the art.

The invention provides a mechanical closure assist for a valve, operable for selectively contacting the valve disc at an outer edge to urge the valve disc into engagement with the valve seat. The mechanical closure assist according to the invention can be used with a disc of relatively light weight construction. The closure assist can be mounted in the valve casing adjacent the closed position of the disc, or in an adjoining section of conduit, so as to be fully retractable out of the valve flow path when the disc is in the open position, thereby minimizing resistance to flow through the valve. The closure assist acts on the edge of the valve which tends to be lifted by pressure, and provides a convenient and inexpensive means for overcoming the unequal effect of pressure on a stepped valve seat or similar arrangement.

SUMMARY OF THE INVENTION

It is an object of the invention to improve the sealing characteristics of a shutoff valve, for example having a rotatable disc with a stepped valve seat, by providing a retractable closure assist operable to urge the disc against its seat in the closed position of the disc.

It is another object of the invention to facilitate sealing operation of rotatable disc shutoff valves to enable use of a lighter weight disc constructions.

It is a further object of the invention to seal a shutoff valve having a displaceable disc, such as a rotatable disc driven by a simple actuation linkage, by producing supplemental pressure for urging the disc against its seat at least at one point spaced from a disc rotation axis.

It is still another object of the invention to provide a shutoff valve assist which minimizes restrictions in the flow path when the disc is in the open position.

These and other objects are provided by a mechanical closure assist for a valve such as a pivoting disc valve, operable for contacting a portion of the valve disc to urge the disc into engagement with a valve seat. A valve equipped with the closure assist includes a casing having a wall and an internal surface defining the valve seat. A disc is pivotable within the casing from an open position to a closed position. The disc defines front and back faces, for example relative to the higher pressure side of the valve. The front face has a sealing surface for sealingly contacting the valve seat when the disc is in the closed position. The mechanical closure assist includes a cylinder apparatus which can be mounted in the valve casing or in an adjacent portion of conduit, and has a rod movable from a retracted to an extended position. An end of the rod contacts the back face of the disc when the rod is in the extended position. The cylinder apparatus can be attached to an outside of the casing, the adjacent conduit portion or the like. The rod is movable through a hole in the wall of the casing to engage the disc and exert a pressure on the disc tending to seal the disc in sealing engagement with its seat.

The rod can be movable partly laterally and partly axially, in a direction opposite to the direction of flow through the valve, bearing against a low pressure side of the disc and urging the disc against a seat on the high pressure side of the valve. The invention thus reverses the tendency of differential pressure on the disc to lift the disc from its seat on one side of the rotation axis of the disc.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein.

DETAILED DESCRIPTION OF THE PREFERRED EMBODIMENTS

Figure 1:
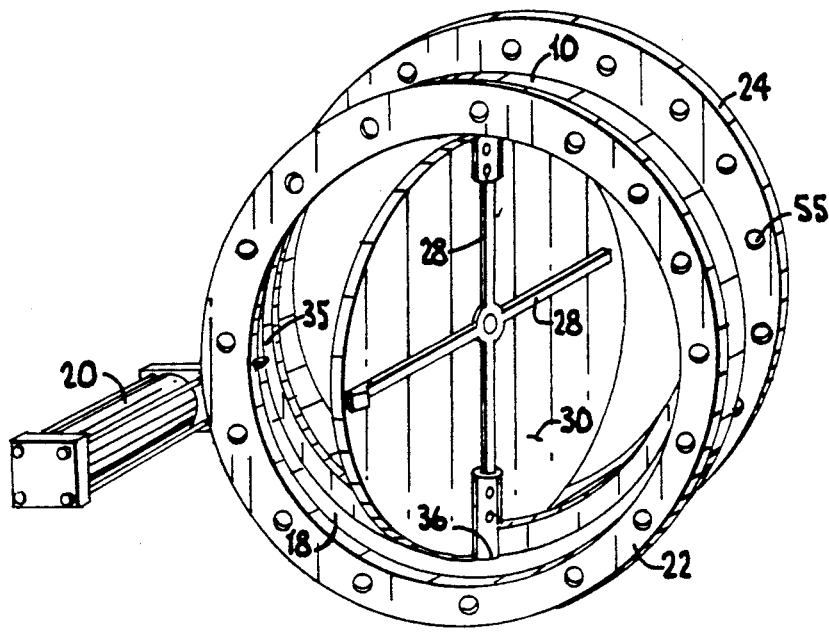
FIG. 1 is a perspective view of a valve according to the invention having a valve disc in an open position.
Figure 2:
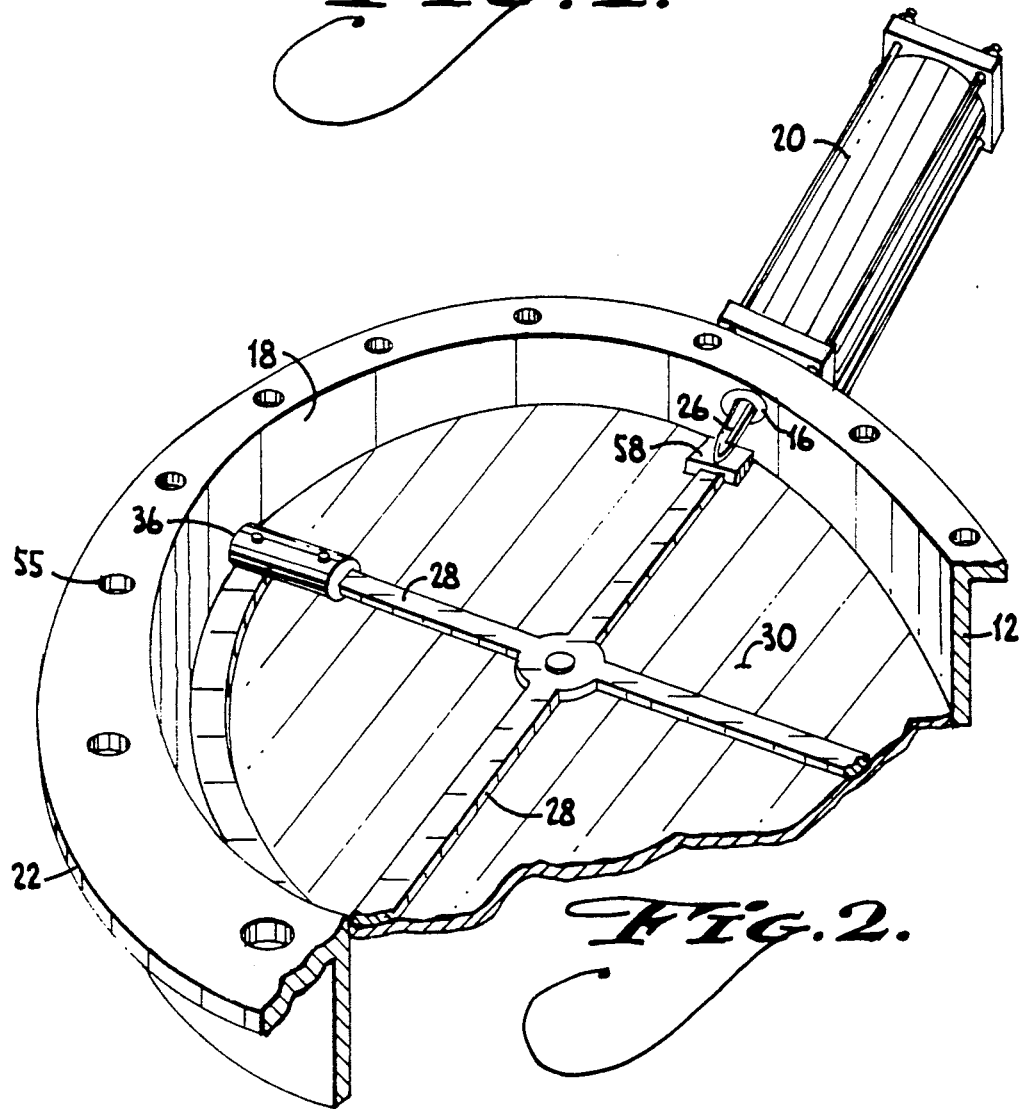
FIG. 2 is a top perspective view of a valve having mechanical closure assist according to the invention, engaged against a back face of a valve disc.

A mechanical closure assist according to the invention is shown in FIGS. 1 and 2. The closure assist in this case is mounted directly in the valve casing 10 and bears on the valve disc 30 or similar movable closure body. The valve has a valve casing 10 with a wall 12 and an internal surface 18 which defines a fluid passageway through the valve. The valve casing 10 is dimensioned for insertion between adjacent ends of piping or other ductwork or the like, which together with the valve define a fluid pathway to be opened or closed using the valve.

The valve casing 10 can include a pair of outer flanges 22, 24 at opposite ends of the valve casing, the flanges defining a plurality of apertures 55 for receiving fasteners such as bolts for attachment to corresponding flanges of the ductwork. The valve casing 10 may also be sealingly attached to the ductwork such as by welding, brazing or similar means. When the casing 10 is disposed in the ductwork, the internal surface 18 defines a portion of the fluid pathway.

Figure 3:
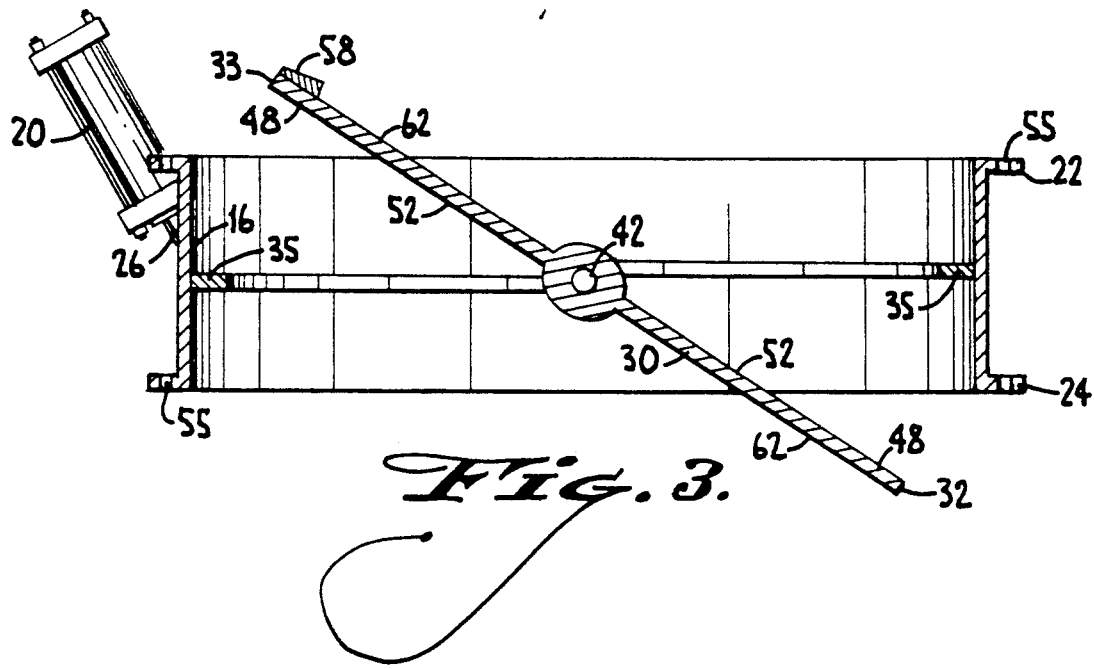
FIG. 3 is a cross-sectional view of a valve and a mechanical closure assist according to the invention, the valve disc being in a partially open position.

A disc 30 is pivotal within the valve casing 10 from an open position to a closed position as shown in FIGS. 3 (partially open) and 4, respectively. The disc 30 preferably has a round outer periphery, although other shapes such as elliptical or rectangular are within the scope of the invention. The disc 30 includes a pair of journals 36 extending from diametrically opposite edges of the disc. The journals 36 are rotatably supported in bearings (not shown) which are integral with or attached to the casing 10. The disc 30 is pivotable on a pivot axis 42 defined by the pair of journals 36. As shown in FIG. 3, the disc 30 is divided by the pivot axis 42 into an upstream segment 32 and a downstream segment 33, the designations "upstream" and "downstream" being determined by a direction of fluid flow through the valve. In the illustrated embodiment wherein the disc 30 is circular, each of the segments 32, 33 has a semi-circular shape. Each of the segments 32, 33 includes a front face 52 defined on a side of the segment which moves forwardly as the disc 30 is pivoted from the open to the closed position, and a back face 62 defined on a reverse side of the segment. As shown more clearly in FIG. 1, the disc is essentially a flat plate member which may have radially extending stiffener ribs 28.

Figure 4:
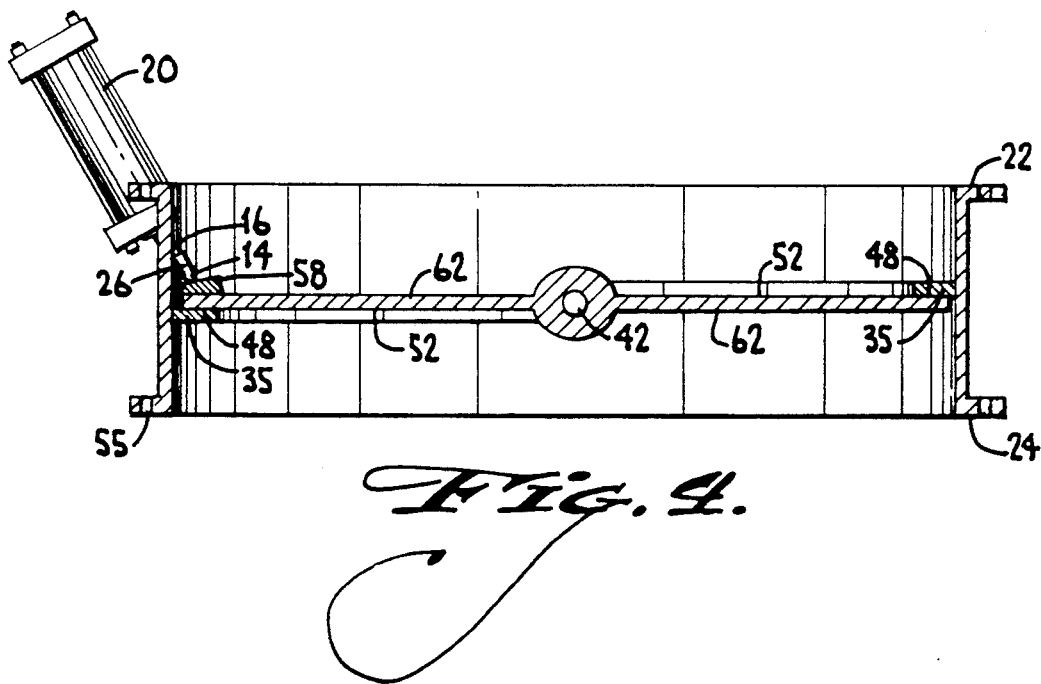
FIG. 4 is a cross-sectional view of a valve having a disc in a closed position, and a mechanical closure assist engaged against the disc.

Referring again to FIGS. 3 and 4, the internal surface 18 defines a pair of valve seats 35 which extend in semicircular arcs on opposite sides of the pivot axis 42. In a preferred embodiment, the valve seats 35 extend perpendicular to a direction of fluid flow through the valve. The valve seat 35 is known in the art as a "step seat" and is machined or otherwise formed to a close tolerance to provide a tight seal when contacted by the disc 30. Each of the front faces 52 of the disc 30 defines a sealing surface 48 at a marginal outer edge for sealingly contacting the valve seat 35 when the disc is in the closed position as shown in FIG. 4. When the disc is in the closed position, a higher pressure exists on one side of the disc than on the other. The higher pressure on the one side of the disc (bottom side as shown in FIG. 4) acts to urge the sealing surface 48 of the upstream segment 32 into engagement with the valve seat 35. On the diametrically opposite side of the disc relative to the rotation axis of the journals, the higher pressure acts upwardly against the downstream segment 33 and with sufficient differential pressure would partially lift the sealing surface 48 of the front face 52 away from the valve seat 35.

The mechanical closure assist according to the invention is provided to maintain the sealing surface 48 of the downstream segment 33 in engagement with the valve seat 35 by providing supplemental pressure on the disc in the area where the differential pressure tends to lift the sealing surface 48 of the front face 52 away from its respective seat 35. The mechanical closure assist includes selectively operable means for contacting the back face 62 of the downstream segment 33 to urge the sealing surface 48 into engagement with the valve seat 35. In a preferred embodiment, the means for contacting comprises an apparatus 20 having a reciprocable rod 26 movable from a retracted to an extended position. The apparatus 20 may be a cylinder having the rod 26 connected to a piston which is movable by hydraulic or pneumatic forces. Alternatively, the reciprocating apparatus 20 may be an electrically operable solenoid, or a manually operable device such as a jackscrew. In any case, the apparatus 20 provides a mechanical assist for urging the disc against its seat on the side of the disc which otherwise tends to be lifted from its seat by fluid pressure.

Reciprocating apparatus 20 can be placed directly in the valve casing as shown, or provided in the wall of an adjacent section of conduit that is close enough to cause the movable rod 26 to bear against the disc 30. The rod can be arranged to advance obliquely relative to the centerline of flow through the valve. Alternatively, the rod can advance perpendicular to the centerline, an be shaped as a wedge whereby advance of the rod presses the disc toward the seat in a direction parallel to the centerline.

In the preferred embodiment shown in FIG. 4, the apparatus 20 is oriented such that when the disc 30 is in the closed position, an end 14 of the rod 26 contacts a pad 58 attached to the back face 62. The end 14 of the rod may be flat, rounded or beveled.

The apparatus 20 is attached to an outside of the wall 12 of the valve casing 10, or a casing defined by an adjacent section of conduit, in order that the apparatus 20 does not present a restriction to flow. The rod 26 is movable through a hole 16 in the wall 12. When in the extended position, the end 14 of the rod 26 preferably contacts the pad 58 at a shallow angle relative to a line extending perpendicular to the back face 62. In order to alleviate side loading on the rod 26, the pad 58 is preferably a low profile wedge which defines a contact surface disposed perpendicular to the rod 26.

Preferably, the end 14 of the rod 26 returns at least to the inner surface of wall 12 when the rod is retracted. Therefore, no part of the means for selectively contacting resides in the flow pathway beyond the internal surface 18 when the rod is retracted, and the invention does not introduce any additional restrictions to fluid flow through the valve and its associated conduits when the disc is in the open position.

Figure 5:
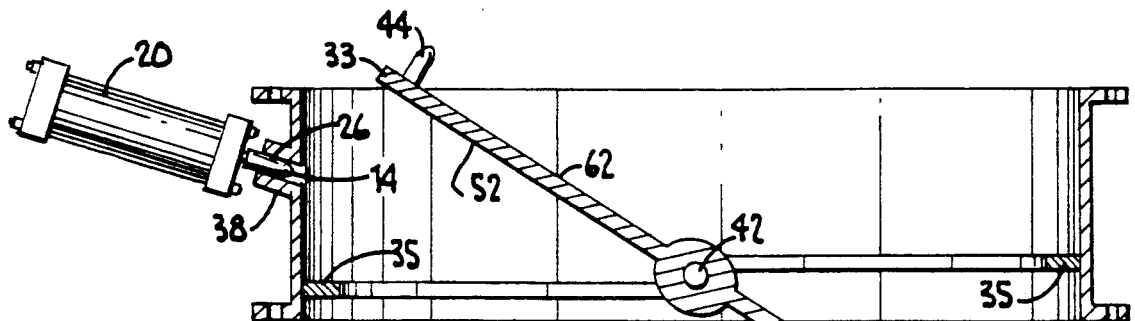
FIG. 5 is a cross-sectional view of an alternative embodiment of the valve having mechanical closure assist, the valve disc being in a partially open position.
Figure 6:
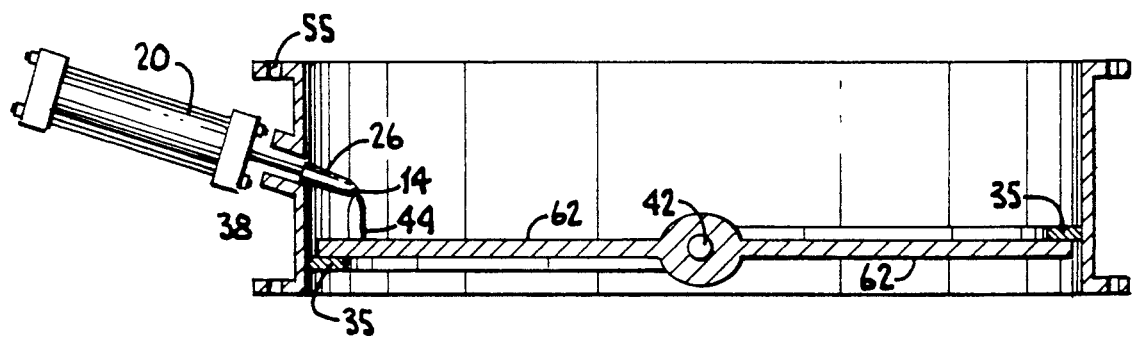
FIG. 6 is a cross-sectional view of the alternative embodiment shown in FIG. 5, the disc being in a closed position.

An alternative embodiment is shown in FIGS. 5 and 6, wherein like elements are referred to by the same reference numbers as in FIGS. 3 and 4. In the alternative embodiment, a post 44 is attached to the back face 62 of the valve disc 30. The apparatus 20 is oriented at a substantial angle from perpendicular relative to the back face 62. The end 14 of the rod is substantially conically shaped so that it may slidably contact an end of the post 44 with a wedging action. The wedging action imparts a significant side load on the rod 26. In order to prevent excessive wear of seals in the apparatus 20, the rod 26 may be annularly disposed in a guide 38 attached to the casing 30 and acting as a bushing means for resisting side loading of the rod.

The invention has the advantage that, for a valve having a displaceable disc of large diameter which relies on metal to metal contact for sealing, a tight seal is maintained between the valve seat and the sealing surface of the disc. Differential pressure from the upstream to downstream sides, acting to deform the disc and bend the disc away from the valve seat, is counteracted by the force of the rod engaged against the back face of the disc. The invention provides a simple yet effective means for providing a positive seal between the disc and its seat.

The invention having been disclosed, a number of variations will now become apparent to those skilled in the art. Whereas the invention is intended to encompass the foregoing preferred embodiments as well as a reasonable range of equivalents, reference should be made to the appended claims rather than the foregoing discussion of examples, in order to assess the scope of the invention in which exclusive rights are claimed.

I claim:

1. In combination, a valve and a mechanical closure assist for the valve, comprising:
   a valve casing having a cylindrical wall and annular surface portions on the wall defining a valve seat;
   the cylindrical wall defining a fluid passageway having a central axis;
   a disc within the casing reversibly pivotable about a pivot axis between open and closed positions, the disc defining a sealing surface for sealingly contacting the valve seat while the disc is in the closed position;
   a selectively oriented reciprocating apparatus mounted to the outside of the casing and having a rod that is extensible and retractable in a linear direction through a hole in the casing;
   the selective orientation thereof being such that a phantom extension along said linear direction as extending from the reciprocating apparatus and into the fluid passageway terminates in an intersection with a plane containing both the pivot axis and the central axis;
   said intersection defining an angle substantially less than 45 degrees; and,
   the reciprocating apparatus being selectively operable to drive the rod so that an end thereof contacts the back face of the disc to urge the sealing surface into engagement with the valve seat.

2. The combination of claim 1 wherein:

The reciprocating apparatus comprises a hydraulic cylinder which includes seals slidingly engaging the rod; and, said selective orientation reduces side loads between the seals and rod, thereby reducing wear on the seals.

3. The combination of claim 1 wherein:

the end is disposed generally perpendicular to the back face while the disc is in the closed position such that the rod is generally loaded in compression as the rod urges the sealing surface into engagement with the valve seat; and, said compressive loading is partly a product of fluid pressure differentials between the upstream and downstream sides of the disc.

4. The combination of claim 1 wherein:

said angle generally is about 30 degrees.

5. The combination of claim 1 wherein:

said phantom extension terminates in an intersection with the central axis.

6. The combination of claim 1, wherein a pad is attached to the back face, and the rod is selectively operable for contacting the pad.

7. The combination of claim 1, wherein the pad defines a contact surface disposed perpendicular to the rod.

8. The combination of claim 1, wherein the end of the rod resides outside of the fluid passageway when the rod is in the retracted position.

9. The combination of claim 1, wherein the rod is movable by hydraulic pressure.

10. The combination of claim 1, wherein the rod is movable by pneumatic pressure.

11. The combination of claim 1, wherein the reciprocating apparatus comprises an electrically operable solenoid.

12. The combination of claim 1, wherein the reciprocating apparatus comprises a manually operable jackscrew.

* * * * *